Figure 1:
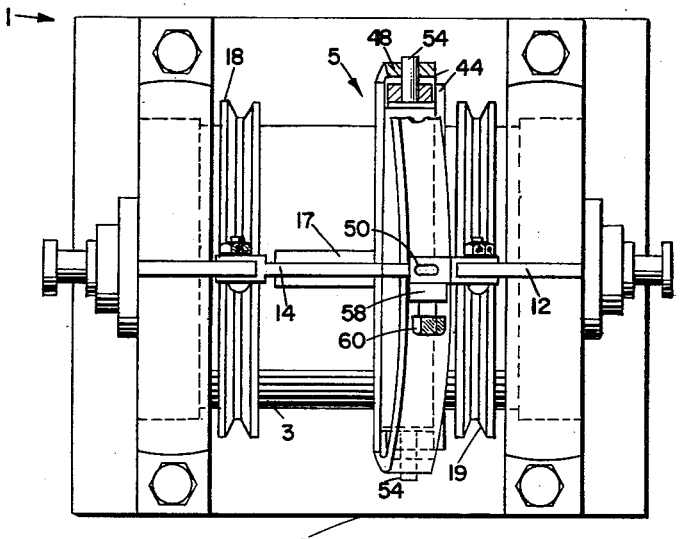

April 28, 1964 E. A. GESSNER 3,130,603
ECCENTERDRIVE WITH MEANS FOR CHANGING THE
OUTPUT AMPLITUDE DURING OPERATION
Filed Jan. 10, 1961 8 Sheets-Sheet 1

Ernest A. Gessner,
INVENTOR.

BY S. J. Rotondi
A. T. Dupont
Jack W. Voigt $A = 2R \sin 1/2\alpha$

Ernest A. Gessner,
INVENTOR.

April 28, 1964 E. A. GESSNER 3,130,603
ECCENTERDRIVE WITH MEANS FOR CHANGING THE
OUTPUT AMPLITUDE DURING OPERATION
Filed Jan. 10, 1961 8 Sheets-Sheet 3

Ernest A. Gessner,
INVENTOR.
BY S. J. Rotondi
A. L. Dupont
Jack W. Voigt

April 28, 1964     E. A. GESSNER     3,130,603
ECCENTERDRIVE WITH MEANS FOR CHANGING THE
OUTPUT AMPLITUDE DURING OPERATION Filed Jan. 10, 1961     8 Sheets-Sheet 4

Ernest A. Gessner,
*INVENTOR.*

BY S. J. Rotondi
A. J. Dupont
Jack W. Voigt

Ernest A. Gessner,
INVENTOR.

Ernest A. Gessner,
INVENTOR.

BY S. J. Rotondi
A. L. Dupont
Jack W. Voigt

April 28, 1964

E. A. GESSNER 3,130,603

ECCENTERDRIVE WITH MEANS FOR CHANGING THE
OUTPUT AMPLITUDE DURING OPERATION

Filed Jan. 10, 1961

8 Sheets-Sheet 8

Ernest A. Gessner,
INVENTOR.

BY S. J. Rotondi
A. L. Dupont
Jack W. Voigt

United States Patent Office 3,130,603
Patented Apr. 28, 1964

3,130,603
ECCENTERDRIVE WITH MEANS FOR CHANGING THE OUTPUT AMPLITUDE DURING OPERATION
Ernest A. Gessner, 4130 Flory Ave., El Paso, Tex.
Filed Jan. 10, 1961, Ser. No. 81,908
10 Claims. (Cl. 74—600)
(Granted under Title 35, U.S. Code (1952), sec. 266)

The invention described herein may be manufactured and used by or for the Government for governmental purposes without the payment of any royalty thereon.

This invention relates to an eccenterdrive having means for changing the amplitude of its output during operation. Such a mechanism can be used wherever it is desirable to change the stroke of a machine while it is operating. The term eccenterdrive as used in this application refers to a drive mechanism having eccentrically arranged output means disposed for converting rotary motion to reciprocating motion. For example, in combustion-engines, compressors, mixers, agitators, pumps and shaping-machines strokes of different lengths are desirable.

The conventional eccentric adjusting mechanism, provided with means for changing amplitude, requires that the machine (utilizing the eccenterdrive) be stopped and the stroke manually changed, thereby, interrupting the process and creating wasted time.

In view of these facts, an object of this invention is to provide an eccenterdrive with means for manually changing the amplitude of its output while the device is operating.

Another object is to provide an eccenterdrive with means for automatically changing the amplitude of its output while the machine is operating.

Another object of this invention is to provide an eccenterdrive suitable for workable connection of a plurality of the units.

A further object is to provide an eccenterdrive capable of providing two outputs, both having a stroke of a different length.

Figure 2:
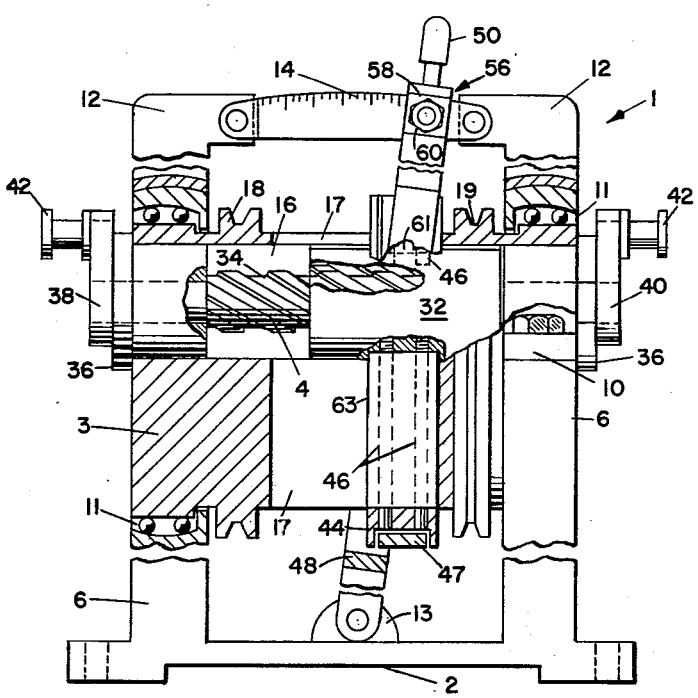
Figure 3:
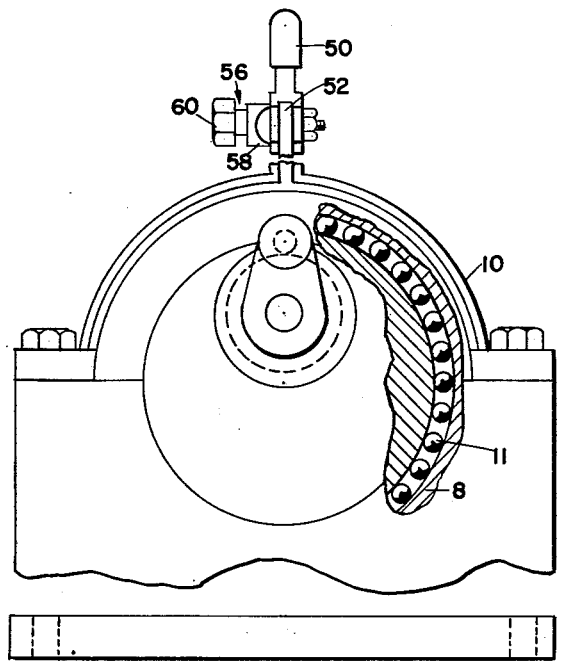
Figure 4:
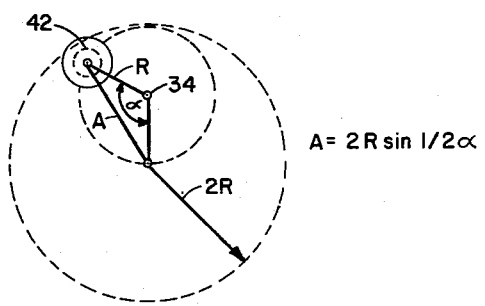
Figure 5:
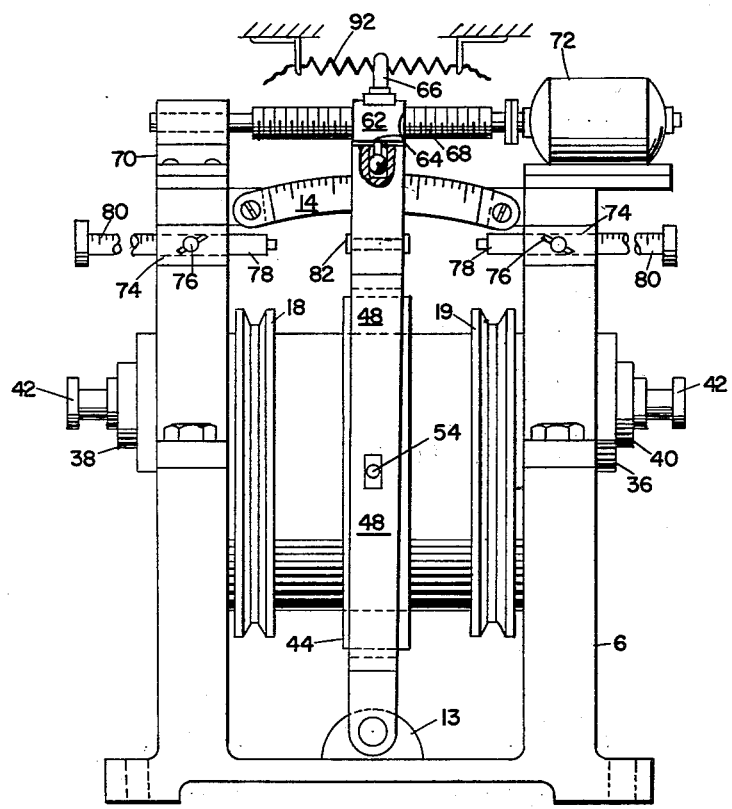
Figure 9:
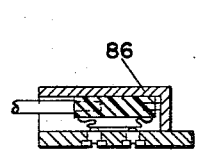
Figure 10:
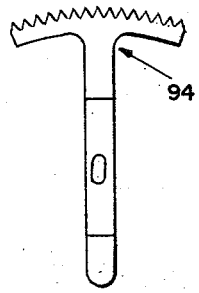
Figure 6:
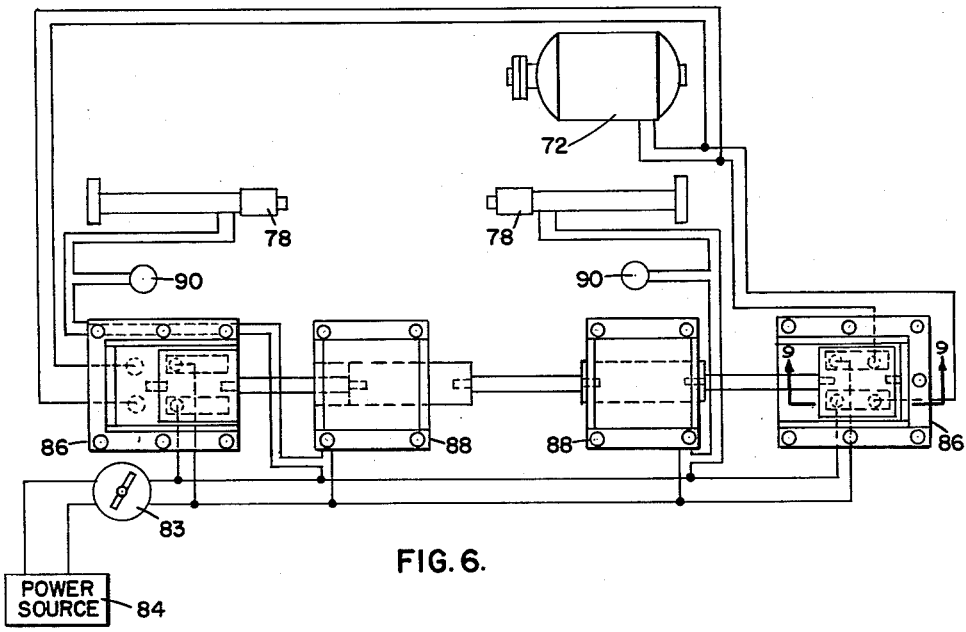
Figure 7:
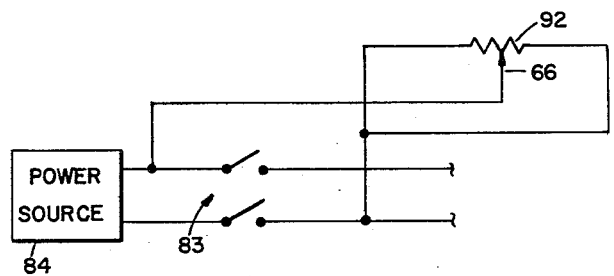
Figure 8:
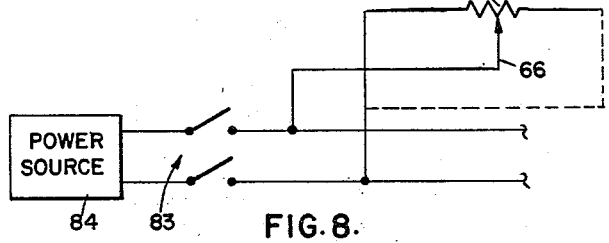
Figure 11:
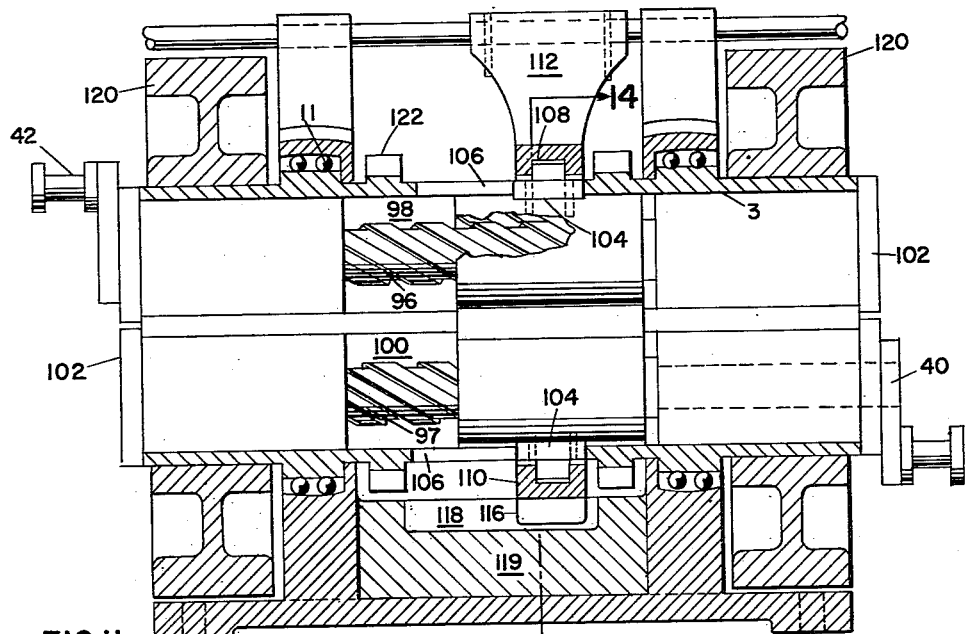

The foregoing and other objects of this invention will become more fully apparent from the following detailed description and from the accompanying drawings, in which:

FIGURE 1 is a plan view of the eccenterdrive.
FIGURE 2 is an elevational view, partly broken away and partly in section, of FIGURE 1.
FIGURE 3 is an end elevational view, partly broken away, of FIGURE 1.
FIGURE 4 is a schematic diagram showing a representation of movement obtainable with the invention.
FIGURE 5 is an elevational view of a second embodiment of the invention having means for automatically changing the amplitude of its output.
FIGURE 6 is a semischematic view showing the means for automatically controlling the amplitude.
FIGURE 7 is a schematic view showing how a power varying resistor is hooked up with FIGURE 6.
FIGURE 8 shows an alternate way that the resistor can be hooked up to FIGURE 7. The dotted line shows that the solid line attached to the resistor can also be connected to the other end of the resistor.
FIGURE 9 is a sectional view, along the line 9—9 of FIGURE 6, of one of the switches used in the automatic control means of FIGURE 6.
FIGURE 10 is an elevational view of another type of shifting lever, which can be used to replace the lever used in FIGURE 5.
FIGURE 11 is an embodiment of the invention, partly in section and partly broken away, utilizing two adjustable shafts for providing a different output amplitude from each shaft.

Figure 12:
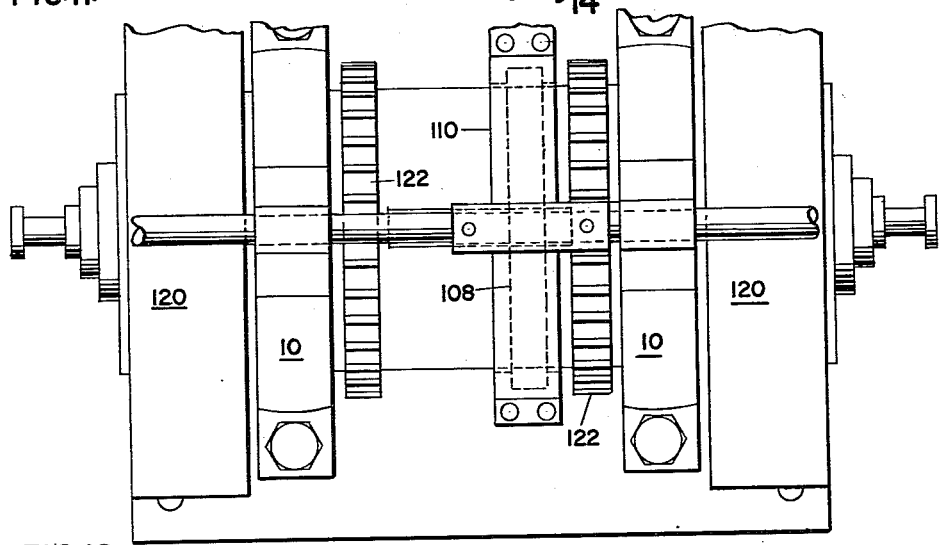
Figure 13:
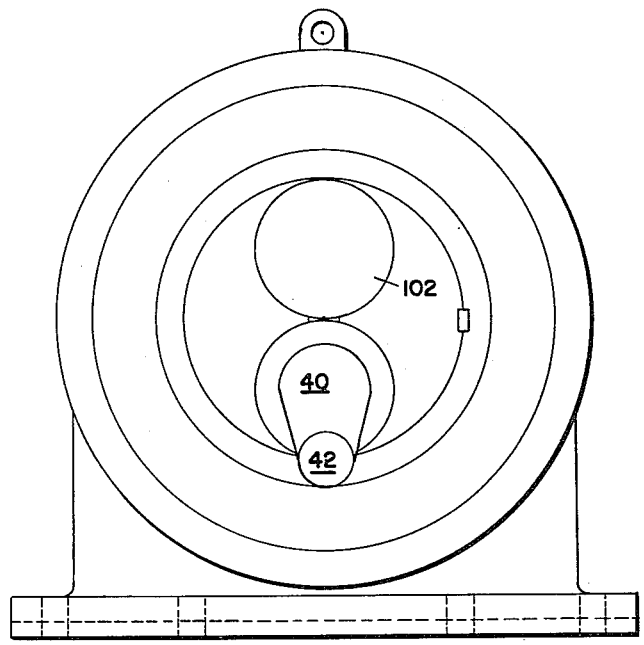
Figure 14:
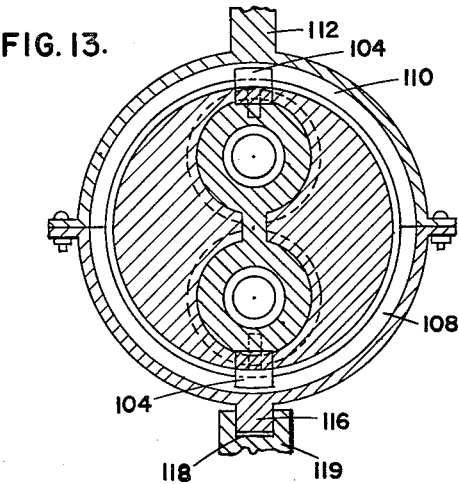
Figure 15:
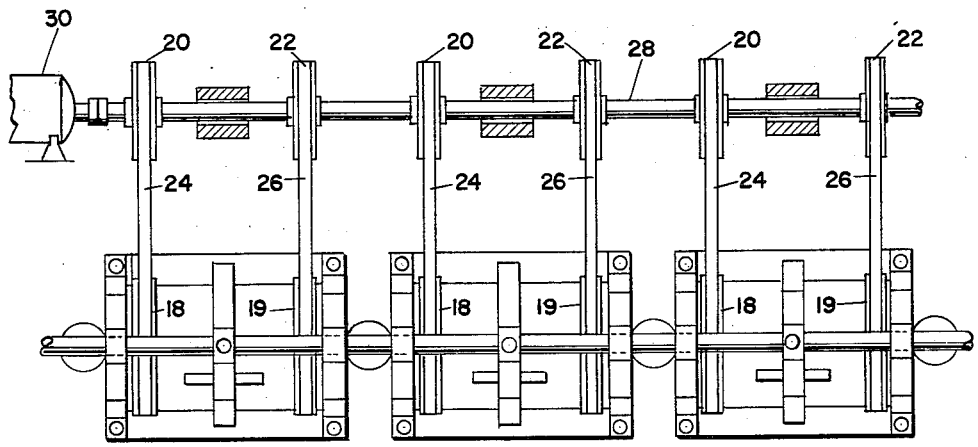
Figure 16:
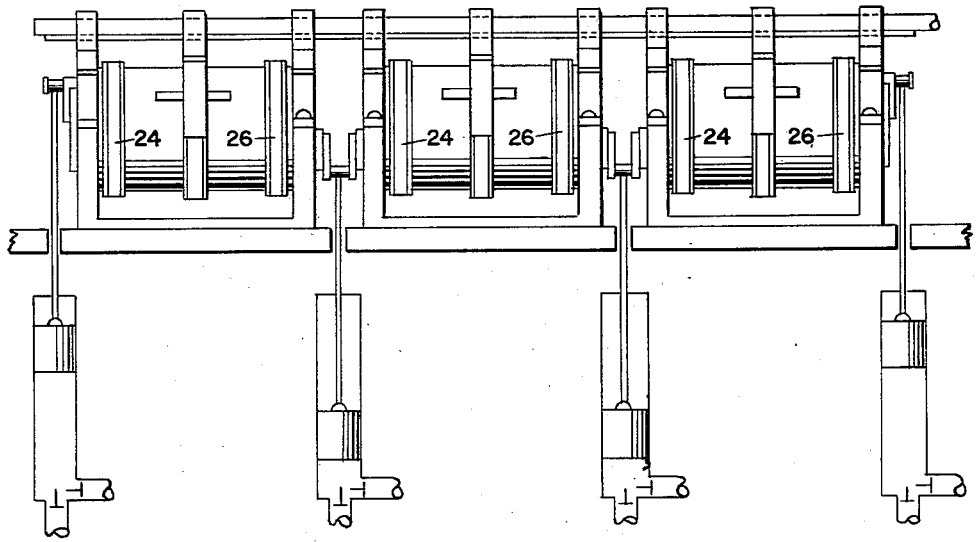
Figure 17:
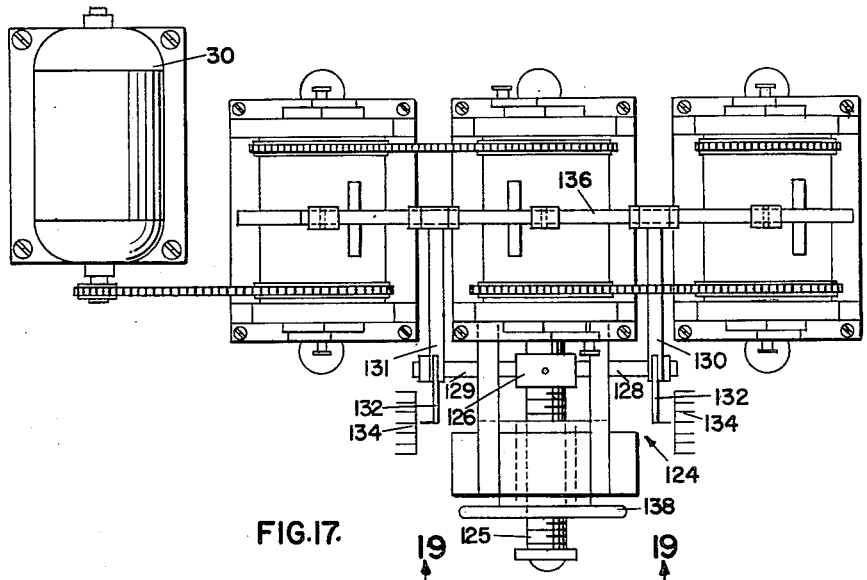
Figure 18:
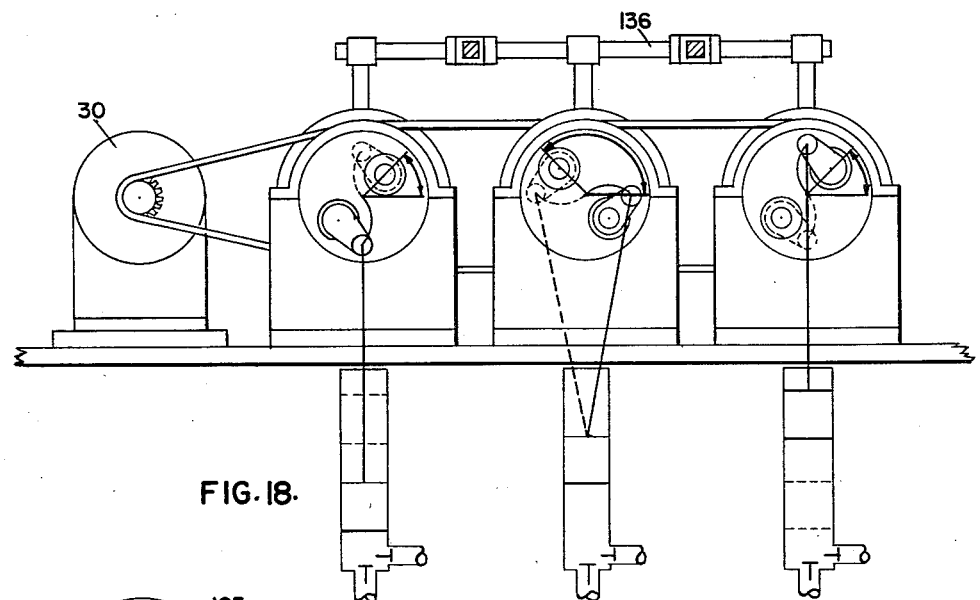
Figure 19:
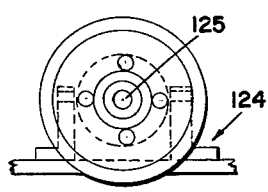

FIGURE 12 is a plan view of FIGURE 11.
FIGURE 13 is an end view of FIGURE 12.
FIGURE 14 is a sectional view, partly broken away, along line 14—14 of FIGURE 11.
FIGURE 15 is a plan view, partly in section and partly broken away, showing a plurality of the units connected together for operating a plurality of pumps at different outputs.
FIGURE 16 is an elevational view, of FIGURE 15, showing the arrangement of the mechanisms and the displacements of the pistons of the pumps.
FIGURE 17 is a plan view showing a plurality of the units connected together for operating a plurality of pumps at different outputs, and the means for adjusting the amplitude of the output.
FIGURE 18 is an elevational view partly broken away, of FIGURE 17, showing the arrangement of the units and the displacement of the pump's pistons.
FIGURE 19 is a view along the plane of line 19—19 of FIGURE 17.

In the drawings, wherein for the purpose of illustration the invention is shown, the numeral 1 designates an eccentric adjusting mechanism having a mounting base 2, a rotor 3, a threaded output shaft 4 and means 5 for changing the output amplitude of said mechanism.

Mounting base 2 is provided with a stanchion 6 at each end. Each stanchion is provided with an apertured portion 8 and is divided to provide a removable upper section 10. The apertured portions retain a pair of bearings 11 in position when the sections are joined. Each upper section has one end of an L-shaped member 12 secured to it, at substantially its center, by welding or other suitable means. The other end of each L-shaped member is secured to a displacement scale 14. For a purpose to be explained later, base 2 is provided with an apertured ear 13 intermediate the base of said stanchions.

Rotor 3 is retained, at each of its ends, in bearings 11, which are secured in apertured portions 8 of stanchions 6. The rotor is provided with an eccentric bore 16, which extends thru the journaled portions of said rotor, and a pair of guide slots 17 joining said bore.

Rotor 3 is provided with sheaves 18 and 19 adjacent to bearings 11. The sheaves are connected to pulleys 20 and 22 by resilient belts 24 and 26, FIGURES 15 and 16. The pulleys are secured to shaft 28, which is driven by motor 30.

Eccentric bore 16 also serves as a housing for internally threaded sleeve 32 and externally threaded shaft 34, which coacts with the threads of sleeve 32. Shaft 34 is retained in bore 16 by a pair of flanged sleeves 36, which are rotatably retained in the ends of bore 16. The sleeves are keyed to shaft 34 and are abutted by cranks 38 and 40. One of said cranks is secured to one end of said shaft and one of said flanged sleeves and the other crank is secured to the other end of said shaft and the other flanged sleeve, by any suitable means such as welding. Each of the cranks has a pin 42 secured to it for providing an output take-off means.

In order to change the output amplitude of the mechanism, a recessed ring 44 is loosely fitted around said rotor intermediate said sheaves. Ring 44 is secured to sleeve 32 by a plurality of screws 46, which extend thru guide slots 17 and engage sleeve 32. The screw heads are flush with the base of the recess in ring 44 so that annular member 47 is loosely enclosed in said recess. Member 47 is spaced around ring 44, so that rotor 3 and ring 44 can rotate while member 47 remains stationary.

In order to hold member 47 stationary, an outer ring 48, provided with a handle 50 and a slot 52, is pivoted at its base to apertured ear 13 and is connected to ring 47 by screws 54. Handle 50 is also provided with a locking means 56 for maintaining the mechanism at the desired displacement. This locking means comprises a stationary nut 58 and an adjustable screw 60 for engaging scale 14.

The operation of this embodiment is as follows:

Locking means 56 is released and the desired displacement is set by movement of handle 50. Means 56 is locked and motor 30 is actuated. Power from the motor is transmitted thru shaft 28, pulleys 20 and 22, belts 24 and 26 to sheaves 18 and 19.

The sheaves provide rotational motion to rotor 3, since they are integrally attached to said rotor. Rotation of rotor 3 provides the same rotation for shaft 4 and sleeve 32 since they are housed inside said rotor. Ring 44 is also rotated with rotor 3, since it is secured to sleeve 32.

This rotation provides displacement output at pins 42, which can be changed while the device is in operation. The change is made by releasing locking means 56 and moving handle 50. This moves sleeve 32 along the longitudinal length of bore 16 and the threads on shaft 4 due to outer ring 48 being connected to annular member 47, which is retained in the recess of ring 44.

When sleeve 32 moves along the threads on shaft 4, the shaft is rotated, thereby changing the displacement of the output. After the output is adjusted, the adjusting means is locked in position by means 56.

A second embodiment of the invention is shown in FIGURES 5 and 6, wherein the same reference numerals indicate parts common to both embodiments. In this embodiment the means for controlling the output amplitude is automatic and replaces the manual means used in the first embodiment.

In this form of the invention handle 50, which is attached to outer ring 48 is replaced by a combined frangible connector and safety device 62, which is designed to withstand a predetermined amount of bending stress, before breaking. The connector has one end secured to ring 48, and contains a threaded central aperture 64. The other end of connector 62 is provided with an electrical contact 66 which will be discussed later. The connection between connector 62 and ring 48 can be any type of expansion joint. The requirement for this joint is that it allows for the increase in distance between the pivot point at ear 13 and connector 62 when the connector is moved away from the center of shaft 68.

Aperture 64 is adapted to receive a threaded shaft 68 which is rotatably supported at one end by a bracket 70 secured to one of said stanchions. The other end of the shaft is coupled to a reversible motor 72 which is mounted on the other stanchion. Each stanchion is provided with a bore 74 and a locking bolt 76 normal to and joining said bore.

Each bore 74 is adapted to freely receive a spring-loaded switch 78. These switches are provided with a scale 80 for use in alignment of the switches with relation to ring 48. Each switch is also provided with a groove which is engaged by bolt 76 for locking the switches in position. Ring 48 is provided with a contact 82, on each side, which is arranged to abut each switch 78 to operate each of the switches.

Each of the switches 78 is connected to a section of the circuit for supplying power to motor 72 (FIGURE 6). This circuit consists of a control switch 83 connected to a power source 84, a pair of double pole switches 86 mechanically attached to solenoids 88 for controlling the rotational direction of motor 72 (by control of the flow of power from source 84), and a pair of signalling means 90 for indicating when one of the switches 78 is operated.

Contact 66, referred to above, is utilized when it is desired to vary the speed of motor 72. This variance is accomplished by combining contact 66 with a resistor 92 to form a variable resistor when contact 66 is moved by operation of motor 72.

The electrical connection of the resistor will determine the positions of maximum motor speed. For example, the resistor hookup shown in FIGURE 7 will give maximum motor speed when ring 48 (and attached contact 66) is near either end position of the resistor and minimum motor speed when the ring is at the center of the resistor. Also the circuit shown in FIGURE 8 will give a varying motor speed as contact 66 is moved along the length of the resistor (when connected as shown in solid line, maximum speed is obtained when contact is at the left side of the resistor and decreasing speed as the contact moves to the right side of the resistor. This condition is reversed when the line connected to the left side of the resistor is connected, to the right side of the resistor, as shown in dotted line).

This embodiment can be operated with a constant output amplitude (as the embodiment in FIGURES 1 thru 4) by operating motor 72 until scale 14 indicates the desired displacement. When the scale indicates the desired displacement, motor 72 is turned off thereby setting the displacement at a constant amount.

It is also possible to connect the output of motor 72 to ring 48 by means of a suitable gearing arrangement 94, as shown in FIGURE 10, which replaces connector 62.

The operation of this embodiment is as follows:

Drive motor 30 is turned on and power from the motor is transmitted to sheaves 18 and 19. At this instant the device has a constant displacement. The device can be utilized with this displacement or changed to a different displacement as set forth above.

In order to provide a varying displacement for producing a varying output amplitude switch 83 is turned on. This supplies power, from source 84, to the right-side switch 86 (FIGURE 6), right-side solenoid 88 and motor 72. This power drives motor 72 and threaded shaft 68 in a counterclockwise direction (looking over motor 72, toward contact 66) and creates a movement of connector 62 and connected ring 48 in a direction opposite from motor 72. The operation created by movement of connector 62 and ring 48 is the same as the operation created by movement of handle 50 and ring 48 in first embodiment, except in this embodiment it is done automatically.

When ring 48 has moved a predetermined distance contact 82 will operate the left-side switch 78. This supplies power to the left side solenoid 88 which becomes energized and creates a movement of both solenoids and connected switches 86. This movement opens the right-side switch and closes the left-side switch, thereby feeding power to motor 72 thru the circuit connected to the left-side and changing the rotational output of the motor to a clockwise direction. This change in direction creates a change of direction of ring 48, which continues until the rotation is reversed by the other contact closing the right-side switch 78. When this switch is closed, the right-side solenoid becomes energized, thereby reversing the direction of output from the motor in the same manner described above.

As described in the explanation of the circuits shown in FIGURES 7 and 8, the speed of motor 72 can be changed, while the output amplitude is changing, by utilizing the resistor with the hookup shown in the circuits.

A third embodiment of the invention is shown in FIGURES 11 thru 14, wherein the same reference numerals indicate parts common to all embodiments. This embodiment utilizes two threaded output shafts 96 and 97, housed in rotor 3, for providing two outputs, having different amplitude from the same unit.

Shafts 96 and 97 extend thru bores 98 and 100, which are joined by a slit (FIGURE 14). A pair of integrally connected sleeves having internal threads which match the threads on shafts 96 and 97 are also housed in the slit and bores 98 and 100, so that the threads are operably aligned. With the shafts and sleeves in position a retainer plate 102 is secured to the end of each shaft, which is opposite from the cranks 40 and pins 42.

Each of the sleeves has a member 104 attached to it. These members extend thru a pair of slots 106, in rotor 3, for movable coaction with an internal recess 108 of a sectional ring 110. This ring has an apertured element 112 positioned between the upper sections of the stanchions and a guide member 116 opposite from element 112. Member 116 is disposed in a slot 118, which is formed in bar 119, for movement when it is desired to vary the output amplitude of the device. The output amplitude can be varied by other suitable means, such as utilizing sectional ring 110 as a template, which will be determined by use of the device.

In order to provide rotational stability, this embodiment is provided with a pair of flywheels 120. The flywheels are secured to the rotor, one at each end, adjacent the upper part of each stanchion. If necessary, the flywheels can be used for driving the device instead of the gears 122 which are shown as an alternate drive method. The remainder of the elements are common to all embodiments, except the means, connected to apertured element 112, for moving the sleeves.

A suitable means for performing this movement is shown in FIGURES 17 thru 19. It comprises a frame work 124 supporting a rotatable bolt 125 having a movable nut 126 attached to it. This nut has one end of a pair of arms 128 and 129, which extend in different directions, attached to it.

The other ends of arms 128 and 129 are connected to the ends of a second pair of arms 130 and 131, which are normal to said first arms. A pair of pointers 132, which are disposed to coact with a pair of displacement scales 134, are attached to arms 128 and 129 at their point of connection to arms 130 and 131. The other end of each arm 130 and 131 is connected to a rod 136 that is attached to apertured member 112. With this arrangement the output of the device, or a group of the devices as shown in FIGURE 17 can be varied by operation of wheel 138.

The operation of this device is the same as the other embodiments, except the amplitude of two shafts are varied instead of one shaft.

It is to be understood that the prefered invention is herein shown and described, and that various changes in the shape, size and arrangement of parts may be resorted to without departing from the spirit of the invention or the scope of the subjoined claims.

The following invention is claimed:

1. An eccenterdrive with means for changing the output amplitude during operation comprising: a mounting base having a pair of sectional stanchions provided with openings; bearings secured in said openings; a rotor rotatably disposed in said bearings and provided with a longitudinal bore eccentrically disposed therethrough; means for rotating said rotor; output means provided in said eccentric bore for relative rotation therein with said rotor; crankpins eccentrically arranged on opposite ends of said output means; sleeve means carried in said bore in circumferential slidable relationship with said output means; adjusting mechanism secured to said sleeve means for moving said sleeve means axially along said output means and rotating said output means, for simultaneous rotation of said crankpins to change the eccentricity thereof.

2. A device as set forth in claim 1, in which said means for rotating said rotor comprises a sheave surrounding the periphery of said rotor, drive means, and means connecting said drive means and sheave.

3. A device as set forth in claim 1, in which said output means comprises a threaded shaft.

4. A device as set forth in claim 1, in which said apertured means retained in said rotor comprises a plurality of internally threaded sleeves secured together.

5. A device as set forth in claim 1, in which the ends of said rotor are provided with means for providing rotational stability.

6. A device as set forth in claim 1, in which said output means comprises a plurality of threaded shafts and a plurality of connecting pins secured to said shaft.

7. A device as set forth in claim 1, in which said means for controlling movement of said adjusting mechanism comprises an internally threaded member connected to said outer ring; a threaded shaft coacting with said internally threaded member, said shaft having one end journaled in one of said stanchions; a reversible drive means connected to the other end of said shaft; a circuit for controlling the rotational direction of said motor; and a source of power connected to said circuit.

8. A device as set forth in claim 1, which further comprises an electrical contact secured to said internally threaded member; a resistor, secured to said stanchions, in electrical connection with said contact; and secondary circuit means connecting said contact and resistor to said first-named circuit for varying the speed of said reversible drive means.

9. A device as set forth in claim 8 including sleeve means disposed in circumferential threaded relation with each of said shafts and disposed for slidable movement therealong for rotation of said shafts to change the eccentricity of said crankpins.

10. A device as set forth in claim 9 wherein said rotor is provided with slots on the periphery thereof and said adjusting mechanism includes a member attached to each of said sleeve means and projecting through said slots; a sectional ring mounted circumferentially around said rotor for axial movement therealong and provided with an annular recess to retain said member therein; an element secured to said ring for axial movement thereof and subsequent movement of said element to move each of said sleeve means along each of said shafts for rotation thereof to change the eccentricity of each of said crankpins.

References Cited in the file of this patent

UNITED STATES PATENTS

| | | |
|---|---|---|
| 1,735,459 | Green | Nov. 12, 1929 |
| 1,987,518 | Reilly | Jan. 8, 1935 |
| 2,051,783 | Soke | Aug. 18, 1936 |
| 2,414,003 | Thompson | Jan 7, 1947 |
| 2,438,755 | Larsen | Mar. 30, 1948 |
| 2,693,630 | Rodder | Nov. 9, 1954 |
| 2,943,465 | Musser | July 5, 1960 |

FOREIGN PATENTS

| | | |
|---|---|---|
| 239,414 | Germany | Oct. 14, 1911 |
| 1,120,102 | France | Apr. 16, 1956 |
| 786,587 | Great Britain | Nov. 20, 1957 |